(12) United States Patent  
Muramoto et al.

(10) Patent No.: US 7,579,401 B2
(45) Date of Patent: *Aug. 25, 2009

(54) SOLID POLYMER ELECTROLYTE

(75) Inventors: Hiroo Muramoto, Ichihara (JP); Takeshi Niitani, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 10/523,085

(22) PCT Filed: Jul. 23, 2003

(86) PCT No.: PCT/JP03/09328

§ 371 (c)(1), (2), (4) Date: Feb. 2, 2005

(87) PCT Pub. No.: WO2004/009663

PCT Pub. Date: Jan. 29, 2004

(65) Prior Publication Data

US 2005/0256256 A1    Nov. 17, 2005

(30) Foreign Application Priority Data

Jul. 23, 2002    (JP)    ............... 2002-214603

(51) Int. Cl.
*C08F 118/02*    (2006.01)
(52) U.S. Cl. .................. 524/556; 525/314; 526/319; 526/329.3
(58) Field of Classification Search .............. 524/556; 525/314; 526/319, 329.3
See application file for complete search history.

(56) References Cited

U.S. PATENT DOCUMENTS

| 5,196,484 A * | 3/1993 | Giles et al. ................. 525/314 |
| 6,096,234 A * | 8/2000 | Nakanishi et al. .......... 252/62.2 |
| 6,596,440 B2 * | 7/2003 | Gavelin et al. .............. 429/306 |
| 2001/0033974 A1 * | 10/2001 | Gavelin et al. .............. 429/306 |
| 2005/0256256 A1 | 11/2005 | Muramoto et al. |
| 2006/0204854 A1 * | 9/2006 | Fujimoto et al. ............ 429/303 |

FOREIGN PATENT DOCUMENTS

| EP | 1553117 | 7/2005 |
| JP | 05-120912 A | 5/1993 |
| JP | 11-240998 A | 9/1999 |
| WO | WO-0146280 | 6/2001 |
| WO | WO-0233765 | 4/2002 |
| WO | WO 0233765 A1 * | 4/2002 |

OTHER PUBLICATIONS

Khan et al. "ABA triblock comb copolymers with oligo(oxyethylene)side chains as matrix for ion transport", Makromoleculare Chemie, 190, 1069-1078 (1988).*
Khan et al. al. "ABA triblock comb copolymers with oligo(oxyethylene)side chains as matrix for ion transport", Makromoleculare Chemie, 190, 1069-1078 (1988).*
Supplementary European Search Report for EP 03 76 5362 completed Feb. 7, 2006.
"Atom transfer radical polymerization of hydrophilic monomers in aqueous media at ambient temperature" by Wang et al., Polymer Reprints (American Chemical Society, Division of Polymer Chemistry), 41(1), pp. 484-485 CODEN: ACPPAY; ISSN: 0032-3934, 2000, XP009061102.
International Search Report for PCT/JP03/09328 mailed on Sep. 16, 2003.
Patent Abstracts of Japan for 10-208545 published on Aug. 7, 1998.
Patent Abstracts of Japan for 11-043523 published on Feb. 16, 1999.
Patent Abstracts of Japan for 10-237143 published on Sep. 8, 1998.
Patent Abstracts of Japan for 03-196407 published on Aug. 27, 1991.
Ishrat M. Khan, et al., "ABA Triblock comb copolymers with oligo (oxyethylene) side chains as matrix for ion transport", Macromolecular Chemistry and Physics, May 1989, pp. 1069-1078, vol. 190, No. 5.
G. Feuillade, et al., "Ion-conductive macromolecular gels and membranes for solid lithium cells", Journal of Applied Electrochemistry, Feb. 1975, pp. 63-69, vol. 5.

* cited by examiner

*Primary Examiner*—David Wu
*Assistant Examiner*—Michael M Bernshteyn
(74) *Attorney, Agent, or Firm*—Darby & Darby, P.C.

(57) ABSTRACT

An object of the present invention is to provide a practical solid polymer electrolyte that exhibits excellent thermal characteristics, physical characteristics, and ionic conductivity, and in particular, to provide a completely solid electrolyte and a copolymer composition that functions as the substrate for producing such an electrolyte. A solid polymer electrolyte comprising an electrolyte salt, and a copolymer in which a block chain A containing a repeating unit represented by a formula (I) shown below,

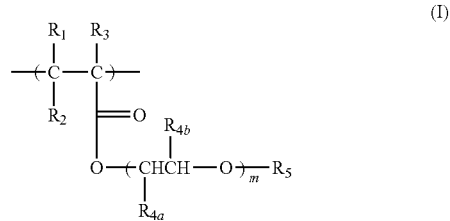

a block chain B containing a repeating unit represented by a formula (II) shown below:

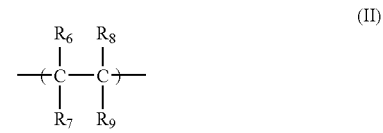

(wherein, $R_9$ represents an aryl group), and a block chain C containing a repeating unit represented by a formula (III) shown below:

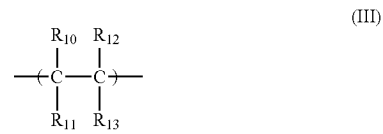

(wherein, $R_{13}$ represents an aryl group or a heteroaryl group) are arranged in the sequence B, A, C.

19 Claims, 1 Drawing Sheet

FIG.1

SOLID POLYMER ELECTROLYTE

CROSS-REFERENCE TO PRIOR APPLICATION

This is a U.S. National Phase application under 35 U.S.C. §371 of International Patent Application No. PCT/JP2003/009328 filed Jul. 23, 2003, and claims the benefit of Japanese Patent Application No. 2002-2 14603 filed Jul. 23, 2002 both of which are incorporated by reference herein. The International Application was published in Japanese on Jan. 29, 2004 as WO 2004/009663 A1 under PCT Article 21(2).

TECHNICAL FIELD

The present invention relates to a solid polymer electrolyte that is particularly useful for use within secondary batteries

BACKGROUND ART

Although batteries have long been used, they have recently been recognized as one of the extremely important base components, together with semiconductors and liquid crystal display elements, in the information age. Particularly in the cases of portable telephones and notebook type personal computers, the demands for improved battery performance and reduced battery weight are strong, and lithium ion batteries are attracting considerable attention as one type of battery capable of meeting these demands. Lithium ion batteries offer higher energy densities and more rapid charging times than other batteries such as nickel-cadmium batteries, and offer considerable promise for the future.

In electrochemical elements such as primary batteries, secondary batteries and capacitors, liquids have traditionally been used as the electrolyte, but liquid electrolytes are prone to leakage and do not provide ideal long-term reliability. In contrast, solid electrolytes do not suffer from these drawbacks, and the application of such solid electrolytes to a variety of electrochemical elements not only simplifies the production of the element, but also enables reductions in the size and weight of the element, and because of the lack of any leakage problems, enables the provision of a highly reliable element.

Accordingly, in the field of lithium ion battery research, the research and development of new solid electrolytes, and in particular the research and development of solid polymer electrolytes that are lightweight, flexible and readily processed, is being actively pursued.

Almost all polymer compounds are insulators, but since the announcement that certain polymer materials such as polyethylene oxide (PEO) are capable of forming a crystalline complex with electrolyte salts such as lithium salts, resulting in a high ionic conductivity, much attention has been focused on research into solid polymer electrolytes that use PEO or other polyalkylene oxides, or polyethyleneimines or polyphosphazenes that contain similar ion dissociation groups as the electrolyte matrix. There have been many publications of research relating to solid polymer electrolytes in which a polyalkylene oxide represents one component of the matrix, and the ionic conductivity at room temperature has now reached $10^{-4}$ to $10^{-6}$ S/cm. However, in order to achieve a high ionic conductivity, the polyalkylene oxide content within the matrix must be increased, but unfortunately this leads to a marked deterioration in the strength and heat resistance of the electrolyte film, meaning producing a practical solid electrolyte has been difficult. Moreover, the ionic conductivity also decreases dramatically if the temperature falls to 0° C. or lower (see Japanese Unexamined Patent Application, First Publication No. Hei 5-120912, and J. Appl. Electrochem., No. 5, 63 to 69 (1975)).

A solid polymer electrolyte in which the matrix substrate comprises an ABA type triblock copolymer produced by copolymerizing methoxypolyethylene glycol monomethacrylate (A) and styrene (B) via a living anionic polymerization has been proposed as a suitable solid polymer electrolyte (see Makromol. Chem., 190, 1069 to 1078 (1989)).

However, the homopolymer of the methoxypolyethylene glycol monomethacrylate of the component (A) is a liquid at room temperature, even at very high molecular weights, meaning that in order to ensure that the A-B-A copolymer forms a solid electrolyte matrix substrate, the quantity of the component (A) must be restricted. However, this means that the shape and size of the PEO domain, which functions as the diffusion and transport space for the lithium ions, is also restricted, and as a result, the ionic conductivity at 40° C. was a somewhat unsatisfactory $10^{-6}$ S/cm.

DISCLOSURE OF INVENTION

An object of the present invention is to provide a solid polymer electrolyte that utilizes a microphase separated structure to provide excellent ionic conductivity, thermal characteristics, and physical characteristics.

As a result of intensive investigations aimed at resolving the problems described above, the inventors of the present invention discovered that in a triblock copolymer containing a block chain formed from alkoxypolyethylene glycol mono(meth)acrylate units, if a rigid block chain such as polystyrene is provided at either one, or both terminals of the alkoxypolyethylene glycol mono(meth)acrylate chain, then the pseudo cross-linking effect provided by the rigid block chain enables solidification to be achieved even when the quantity of alkoxypolyethylene glycol mono(meth)acrylate units is increased, thus enabling a higher ionic conductivity to be achieved, and enabling the inventors to complete the present invention.

In other word, a first aspect of the present invention relates to the following:

(1) A solid polymer electrolyte comprising an electrolyte salt, and a copolymer in which a block chain A containing a repeating unit represented by a formula (I) shown below:

(wherein $R_1$ to $R_3$ each represent, independently, a hydrogen atom or a hydrocarbon group of C1 to C10, $R_1$ and $R_3$ may be bonded together to form a ring, $R_{4a}$ and $R_{4b}$ each represent, independently, a hydrogen atom or a methyl group, $R_5$ represents a hydrogen atom, a hydrocarbon group, an acyl group, or a silyl group, m represents an integer from 2 to 100, and individual $R_{4a}$ and $R_{4b}$ groups may be either the same or different), a block chain B containing a repeating unit represented by a formula (II) shown below:

(wherein $R_6$ to $R_8$ each represent, independently, a hydrogen atom or a hydrocarbon group of C1 to C10, and $R_9$ represents an aryl group), and a block chain C are arranged in the sequence B, A, C.

The present invention also relates to the following aspects:

(2) A solid polymer electrolyte according to the first aspect, wherein the block chain C contains a repeating unit represented by a formula (III) shown below:

(wherein $R_{10}$ to $R_{12}$ each represent, independently, a hydrogen atom or a hydrocarbon group of C1 to C10, and $R_{13}$ represents an aryl group or a heteroaryl group).

(3) A solid polymer electrolyte according to either one of the first and second aspects, wherein the block chains A to C form a copolymer with a B-A-C bonding sequence.

(4) A solid polymer electrolyte according to any one of the first through third aspects, wherein the degree of polymerization of the repeating unit represented by the formula (I) is at least 10.

(5) A solid polymer electrolyte according to any one of the first through fourth aspects, wherein the degree of polymerization of the repeating unit represented by the formula (II) is at least 5.

(6) A solid polymer electrolyte according to any one of the second through fifth aspects, wherein the degree of polymerization of the repeating unit represented by the formula (III) is at least 5.

(7) A solid polymer electrolyte according to any one of the first through sixth aspects, wherein the value of m in the formula (I) is an integer from 5 to 100.

(8) A solid polymer electrolyte according to any one of the first through seventh aspects, wherein the value of m in the formula (I) is an integer from 10 to 100.

(9) A solid polymer electrolyte according to any one of the second through eighth aspects, wherein the group $R_{13}$ in the formula (III) is an aryl group, and the degree of polymerization of the repeating unit represented by the formula (III) is at least 5.

(10) A solid polymer electrolyte according to any one of the first through ninth aspects, wherein the molar ratio ((I)/((II)+C)) between the repeating units represented by the formula (I), and the combined total of the repeating units represented by the formula (II) and the repeating units within the block chain C is within a range from 1/30 to 30/1.

(11) A solid polymer electrolyte according to any one of the second through ninth aspects, wherein the molar ratio ((I)/((II)+(III))) between the repeating units represented by the formula (I), and the combined total of the repeating units represented by the formula (II) and the repeating units represented by the formula (III) is within a range from 1/30 to 30/1.

(12) A solid polymer electrolyte according to any one of the first through eleventh aspects, wherein the number average molecular weight of the copolymer is within a range from 5,000 to 1,000,000.

(13) A solid polymer electrolyte according to any one of the first through twelfth aspects, which exhibits a microphase separated structure.

(14) A solid polymer electrolyte according to any one of the first through thirteenth aspects, wherein the electrolyte salt is one or more materials selected from a group consisting of alkali metal salts, quaternary ammonium salts, quaternary phosphonium salts, transition metal salts, and protonic acids.

(15) A solid polymer electrolyte according to any one of the first through thirteenth aspects, wherein the electrolyte salt is a lithium salt.

The present invention also relates to a sixteenth aspect described below:

(16) A copolymer in which a block chain A containing a repeating unit represented by a formula (I) shown below:

(wherein $R_1$ to $R_3$ each represent, independently, a hydrogen atom or a hydrocarbon group of C1 to C10, $R_1$ and $R_3$ may be bonded together to form a ring, $R_{4a}$ and $R_{4b}$ each represent, independently, a hydrogen atom or a methyl group, $R_5$ represents a hydrogen atom, a hydrocarbon group, an acyl group, or a silyl group, m represents an integer from 2 to 100, and individual $R_{4a}$ and $R_{4b}$ groups may be either the same or different), a block chain B containing a repeating unit represented by a formula (II) shown below:

(wherein $R_6$ to $R_8$ each represent, independently, a hydrogen atom or a hydrocarbon group of C1 to C10, and $R_9$ represents an aryl group), and a block chain C containing a repeating unit represented by a formula (III) shown below:

(wherein $R_{10}$ to $R_{12}$ each represent, independently, a hydrogen atom or a hydrocarbon group of C1 to C10, and $R_{13}$ represents an aryl group or a heteroaryl group) are arranged in the sequence B, A, C.

The present invention also relates to the following aspects:

(17) A copolymer according to the sixteenth aspect, wherein the block chains A to C are bonded together in a B-A-C sequence.

(18) A copolymer according to either one of the sixteenth and seventeenth aspects, wherein the degree of polymerization of the repeating unit represented by the formula (I) is at least 10.

(19) A copolymer according to any one of the sixteenth through eighteenth aspects, wherein the degree of polymerization of the repeating unit represented by the formula (II) is at least 5.

(20) A copolymer according to any one of the sixteenth through nineteenth aspects, wherein the degree of polymerization of the repeating unit represented by the formula (III) is at least 5.

(21) A copolymer according to any one of the sixteenth through twentieth aspects, wherein the value of m in the formula (I) is an integer from 5 to 100.

(22). A copolymer according to any one of the sixteenth through twentieth aspects, wherein the value of m in the formula (I) is an integer from 10 to 100.

(23) A copolymer according to any one of the sixteenth through twenty second aspects, wherein the group $R_{13}$ in the formula (III) is an aryl group, and the degree of polymerization of the repeating unit represented by the formula (III) is at least 5.

(24) A copolymer according to any one of the sixteenth through twenty third aspects, wherein the molar ratio ((I)/((II)+(III))) between the repeating units represented by the formula (I), and the combined total of the repeating units represented by the formula (II) and the repeating units represented by the formula (III) is within a range from 1/30 to 30/1.

(25) A copolymer according to any one of the sixteenth through twenty fourth aspects, wherein the number average molecular weight of the copolymer is within a range from 5,000 to 1,000,000.

(26) A copolymer according to any one of the sixteenth through twenty fifth aspects, which exhibits a microphase separated structure.

The present invention also relates to the following aspects:

(27) A method of producing a copolymer according to any one of the sixteenth through twenty sixth aspects, which utilizes a living radical polymerization in which a transition metal complex is used as a catalyst, and an organohalogen compound comprising 1 or more halogen atoms is used as an initiator.

(28) An ion conductive film containing a polymer comprising a polymer segment (P1) that displays ionic conductivity and a polymer segment (P2) that displays no ionic conductivity, wherein the film exhibits a network-type microphase separated structure.

(29) An ion conductive film according to the twenty eighth aspect, wherein the polymer comprising P1 and P2 is a polymer in which the segments are arranged in a P2, P1, P2 sequence.

1) Copolymer used in the Solid Polymer Electrolyte of the Present Invention

A copolymer used in a solid polymer electrolyte of the present invention is a copolymer comprising a block chain A containing a repeating unit represented by the formula (I), a block chain B containing a repeating unit represented by the formula (II), and an arbitrary block chain C, wherein these block chains are arranged in the sequence B, A, C. In this case, the block chain B and the block chain C may be either the same or different.

The statements that the block chains A and B contain repeating units represented by the formulas (I) and (II) respectively include those cases in which the block chains contain other repeating units as structural units in addition to the identified repeating units, as well as those cases in which no other structural units exist within the chains. Furthermore, in those cases where a block chain also contains other repeating units as structural units, there are no particular restrictions on the form of the polymer generated with the repeating unit represented by the above formula, and random polymers, block polymers and alternating polymers are all possible.

Furthermore, the statement that the block chains are arranged in the sequence B, A, C includes those cases in which the blocks are bonded together directly, as well as those cases in which the blocks are bonded together via other structural units such as linkage groups or other polymer chains. In those cases where a copolymer also comprises another polymer chain as a structural unit, this chain may be either a homopolymer, or a binary or higher order copolymer, and in the case of a copolymer, there are no particular restrictions on the bonding within the copolymer, and random, block, and gradient copolymers in which the component ratio gradually changes, are all suitable. Of the cases described above, those cases in which each block chain is bonded in the sequence B-A-C are preferred. In such cases, the term "bonded" means that the block chains are either bonded together directly, or bonded together via a low molecular weight linkage group such as an oxygen atom or an alkylene group.

In the repeating unit represented by the formula (I), the groups $R_1$ to $R_3$ each represent, independently, a hydrogen atom or a hydrocarbon group of 1 to 10 carbon atoms such as a methyl group, ethyl group, n-propyl group, isopropyl group, n-butyl group, sec-butyl group, isobutyl group, t-butyl group, phenyl group, naphthyl group, or benzyl group. Furthermore, $R_1$ and $R_3$ may be bonded together to form a ring.

The groups $R_{4a}$ and $R_{4b}$ each represent, independently, a hydrogen atom or a methyl group, and m represents an integer from 2 to 100, and preferably an integer from 5 to 100, and even more preferably an integer from 10 to 100. The values of m within each repeating unit may be either the same or different, and individual $R_{4a}$ groups and $R_{4b}$ groups may be either the same or different.

$R_5$ represents a hydrogen atom; a hydrocarbon group such as a methyl group, ethyl group, n-propyl group, isopropyl group, n-butyl group, sec-butyl group, isobutyl group, t-butyl group, n-hexyl group, phenyl group, substituted phenyl group, or naphthyl group; an acyl group such as a formyl group, acetyl group, propionyl group, butyryl group, or benzoyl group; or a silyl group such as a trimethylsilyl group or a t-butyldimethylsilyl group.

The groups $R_1$ to $R_5$ may contain a substituent group at a suitable carbon atom, and specific examples of this substituent group include a halogen atom such as a fluorine atom, chlorine atom, or bromine atom, a hydrocarbon group such as a methyl group, ethyl group, n-propyl group, phenyl group, naphthyl group, or benzyl group, an acyl group such as an acetyl group or a benzoyl group, a hydrocarbon oxy group such as a nitrile group, nitro group, methoxy group, or phenoxy group, as well as other groups such as a methylthio group, methylsulfinyl group, methylsulfonyl group, amino group, dimethylamino group, or anilino group.

The degree of polymerization of the repeating unit represented by the formula (I) varies depending on the value of m, although values of at least 10 are preferred, and values of 20 or greater are even more preferred. Specific examples of the repeating unit represented by the formula (I) include the compounds listed below. The compounds listed represent monomers that can be considered as giving rise to the repeating unit represented by the formula (I). Furthermore, these repeating units can be employed either singularly, or in mixtures of two or more different repeating units.

2-methoxyethyl(meth)acrylate, 2-ethoxyethyl(meth)acrylate, 2-methoxypropyl (meth)acrylate, 2-ethoxypropyl(meth) acrylate, methoxypolyethylene glycol (meth)acrylate (in which the number of ethylene glycol units is from 2 to 100), ethoxypolyethylene glycol (meth)acrylate, phenoxypolyethylene glycol (meth)acrylate, methoxypolypropylene glycol (meth)acrylate (in which the number of propylene glycol units is from 2 to 100), ethoxypolypropylene glycol (meth) acrylate, phenoxypolypropylene glycol (meth)acrylate, polyethylene glycol mono(meth)acrylate, 2-hydroxypropyl (meth)acrylate, polypropylene glycol mono(meth)acrylate, polyethylene glycol-polypropylene glycol mono(meth)acrylate, octoxypolyethylene glycol-polypropylene glycol mono (meth)acrylate, lauroxypolyethylene glycol mono(meth) acrylate, stearoxypolyethylene glycol mono(meth)acrylate, the Blemer PME series of compounds (monomers of the formula (I) in which $R_1=R_2=$ a hydrogen atom, $R_3=$ a methyl group, and m=2 to 90) (manufactured by NIPPON OIL & FAT Corporation), acetyloxypolyethylene glycol (meth)acrylate, benzoyloxypolyethylene glycol (meth)acrylate, trimethylsilyloxypolyethylene glycol (meth)acrylate, t-butyldimethylsilyloxypolyethylene glycol (meth)acrylate, methoxypolyethylene glycol cyclohexene-1-carboxylate, and methoxypolyethylene glycol cinnamate.

In the repeating unit represented by the formula (II), the groups $R_6$ to $R_8$ each represent, independently, a hydrogen atom or a hydrocarbon group of 1 to 10 carbon atoms such as a methyl group, ethyl group, n-propyl group, isopropyl group, n-butyl group, sec-butyl group, isobutyl group, t-butyl group, phenyl group, naphthyl group, or benzyl group, and the group $R_9$ represents an aryl group such as a phenyl group, substituted phenyl group, naphthyl group, or anthracenyl group.

Furthermore, the groups $R_6$ to $R_9$ may contain a substituent group at a suitable carbon atom, and specific examples of this substituent group include a halogen atom such as a fluorine atom, chlorine atom, or bromine atom, a hydrocarbon group such as a methyl group, ethyl group, n-propyl group, phenyl group, naphthyl group, or benzyl group, an acyl group such as an acetyl group or a benzoyl group, a hydrocarbon oxy group such as a nitrile group, nitro group, methoxy group, or phenoxy group, as well as other groups such as a methylthio group, methylsulfinyl group, methylsulfonyl group, amino group, dimethylamino group, or anilino group.

The degree of polymerization of the repeating unit represented by the formula (II) is preferably at least 5, and even more preferably 10 or greater. Specific examples of the repeating unit represented by the formula (II) include the compounds listed below. The compounds listed represent monomers that can be considered as giving rise to the repeating unit represented by the formula (II). Furthermore, these repeating units can be employed either singularly, or in mixtures of two or more different repeating units.

Aryl compounds such as styrene, o-methylstyrene, p-methylstyrene, p-t-butylstyrene, α-methylstyrene, p-t-butoxystyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, and 9-vinylanthracene.

The block chain C is a block chain containing an arbitrary repeating unit, although examples of preferred block chains include those containing a repeating unit represented by the formula (III).

In the repeating unit represented by the formula (III), the groups $R_{10}$ to $R_{12}$ each represent, independently, a hydrogen atom or a hydrocarbon group of 1 to 10 carbon atoms such as a methyl group, ethyl group, n-propyl group, isopropyl group, n-butyl group, sec-butyl group, isobutyl group, t-butyl group, phenyl group, naphthyl group, or benzyl group. The group $R_{13}$ represents an aryl group such as a phenyl group, substituted phenyl group, naphthyl group, or anthracenyl group, or a heteroaryl group such as a 2-pyridyl group or 4-pyridyl group.

Furthermore, the groups $R_{10}$ to $R_{13}$ may contain a substituent group at a suitable carbon atom, and specific examples of this substituent group include a halogen atom such as a fluorine atom, chlorine atom, or bromine atom, a hydrocarbon group such as a methyl group, ethyl group, n-propyl group, phenyl group, naphthyl group, or benzyl group, an acyl group such as an acetyl group or a benzoyl group, a hydrocarbon oxy group such as a nitrile group, nitro group, methoxy group, or phenoxy group, as well as other groups such as a methylthio group, methylsulfinyl group, methylsulfonyl group, amino group, dimethylamino group, or anilino group.

The degree of polymerization of the repeating unit represented by the formula (III) is preferably at least 5, and even more preferably 10 or greater. Specific examples of the repeating unit represented by the formula (III) include the compounds listed below. The compounds listed represent monomers that can be considered as giving rise to the repeating unit represented by the formula (III). Furthermore, these repeating units represented by the formula (III) can be employed either singularly, or in mixtures of two or more different repeating units.

Aryl compounds such as styrene, o-methylstyrene, p-methylstyrene, p-t-butylstyrene, α-methylstyrene, p-t-butoxystyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 2-vinylpyridine, 4-vinylpyridine, 2-vinylquinoline, 4-vinylquinoline, 2-vinylthiophene, and 4-vinylthiophene.

A copolymer of the present invention may also contain repeating units that are different from the repeating units represented by the formulas (I) to (III) as structural units, and examples of these other repeating units include the compounds listed below. Furthermore, these repeating units can also be used within the block chain C in those cases where the block chain C does not contain a repeating unit represented by the formula (III). The compounds listed represent monomers that can be considered as giving rise to the repeating units. These repeating units can be employed either singularly, or in mixtures of two or more different repeating units.

Suitable compounds include (meth)acrylates such as methyl (meth)acrylate, ethyl (meth)acrylate, n-butyl (meth) acrylate, t-butyl (meth)acrylate, cyclohexyl (meth)acrylate, benzyl (meth)acrylate, isobornyl (meth)acrylate, dicyclopentenyl (meth)acrylate, 1-adamantyl (meth)acrylate, 2-methyl-2-adamantyl (meth)acrylate, 1-methyleneadamantyl (meth) acrylate, 1-ethyleneadamantyl (meth)acrylate, 3,7-dimethyl-1-adamantyl meth)acrylate, tricyclodecanyl (meth)acrylate, (norbornane (meth)acrylate, menthyl(meth)acrylate, n-propyl (meth)acrylate, isopropyl (meth)acrylate, 2-ethylhexyl (meth)acrylate, isodecyl (meth)acrylate, isooctyl (meth)acrylate, lauryl (meth)acrylate, tetrahydrofuranyl (meth)acrylate, tetrahydropyranyl (meth)acrylate, 3-oxocyclohexyl (meth) acrylate, butyrolactone (meth)acrylate, and mevalonic lactone (meth)acrylate; conjugated dienes such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene, and chloroprene; α,β-unsaturated carboxylic acid imides such as N-methylmaleimide and N-phenylmaleimide; and α,β-unsaturated nitriles such as (meth)acrylonitrile.

In addition, repeating units that contain an intramolecular double bond capable of undergoing copolymerization with a monomer that generates a repeating unit represented by one of the formulas (I) to (III), and also contain at least one functional group selected from a group consisting of a hydroxyl group, carboxyl group, epoxy group, acid anhydride group and amino group may also be incorporated as structural units, and specific examples of such repeating units include the compounds listed below. The compounds listed represent monomers that can be considered as giving rise to the equivalent repeating unit. These repeating units can be employed either singularly, or in mixtures of two or more different repeating units.

-continued

The molar ratio ((I)/((II)+C)) between the repeating units represented by the formula (I), and the combined total of the repeating units represented by the formula (II) and the repeating units within the block chain C is preferably within a range from 1/30 to 30/1. If the proportion of the repeating units represented by the formula (I) is less than 1/30, then a satisfactory level of conductivity cannot be achieved, whereas if the proportion exceeds 30/1, then satisfactory thermal characteristics and physical characteristics cannot be achieved. If the proportion represented by the combined total of the repeating units represented by the formula (II) and the repeating units of the block chain C is less than 1/30, then satisfactory thermal characteristics and physical characteristics cannot be achieved whereas if the proportion exceeds 30/1, then a satisfactory level of conductivity cannot be achieved. Furthermore, in those cases where the block chain C contains a repeating unit represented by the formula (III), these repeating units represented by the formula (III) can simply be inserted within the above ratio in place of the repeating units within the block chain C.

Although there are no particular restrictions on the number average molecular weight of a copolymer of the present invention, values within a range from 5,000 to 1,000,000 are preferred. If the number average molecular weight is less than 5,000, then the thermal characteristics and physical characteristics tend to deteriorate, whereas if the value exceeds 1,000,000, the moldability and film forming characteristics tend to deteriorate. Furthermore, there are no particular restrictions on the ratio (Mw/Mn) between the weight average molecular weight (Mw) and the number average molecular weight (Mn), although in order to ensure formation of the microphase separated structure described below, the ratio is preferably within a range from 1.01 to 2.50, and even more preferably from 1.01 to 1.50.

There are no particular restrictions on the structure of the copolymer of the present invention, provided the block chains A, B, and C are arranged in a specific sequence, although in order to maintain a high level of ionic conductivity when used as a solid polymer electrolyte, the film structure preferably exhibits a microphase separated structure, and even more preferably a network type microphase separated structure.

2) Method of Producing the Copolymer

In those cases where the copolymer of the present invention comprises repeating units of the formulas (IV) and (V) shown below, as well as a repeating unit represented by the general formula (III) as the block chain C, the copolymer can be produced from a compound represented by the formula (VI) shown below, using known methods such as a living radical polymerization that uses a transition metal complex as the catalyst and an organohalogen compound comprising one or more halogen atoms as the polymerization initiator, a living radical polymerization using a stable radical, or a living anionic polymerization. Of these, a living radical polymerization using a transition metal complex as the catalyst and an organohalogen compound comprising one or more halogen atoms as the polymerization initiator is preferred.

(IV)

(V)

(VI)

The groups $R_1$ to $R_{13}$ in the formulas (IV) to (VI) are as defined above. A more specific description of the methods reveals the following options:

(i) a method in which a compound represented by the formula (IV) is reacted via a living radical polymerization method using a bifunctional initiator, and the thus obtained macroinitiator comprising bifunctional block chains and the like is then further reacted with a monomer that generates another block chain, thus sequentially extending the block chain, (ii) a method in which, with the exceptions of using a compound represented by the formula (V) instead of the compound represented by the formula (IV), and using a monofunctional initiator, reaction is conducted in the same manner as (i), thus sequentially extending the block chain from the terminal, and (iii) a method in which each block chain, or a portion of each block chain, is polymerized using a predetermined sequence, and the block chains are subsequently subjected to a coupling reaction.

A living radical polymerization can be conducted using a transition metal complex as the catalyst and an organohalogen compound comprising one or more halogen atoms within each molecule as the polymerization initiator.

The central metal within the transition metal complex is preferably manganese, rhenium, iron, ruthenium, rhodium, nickel, or an element from group 7 to 11 on the periodic table such as copper (using the periodic table disclosed in "Handbook of Chemistry 1, Basic, 4th revised edition" (1993), edited by The Chemical Society of Japan). Of these metals, ruthenium is particularly preferred. There are no particular restrictions on the ligands that can be coordinated with the metal to form the metal complex, although examples of preferred ligands include triarylphosphines of 18 to 54 carbon atoms such as triphenylphosphine and trinaphthylphosphine, trialkylphosphines of 3 to 18 carbon atoms such as triethylphosphine and tributylphosphine, triarylphosphites such as triphenylphosphite, diphenylphosphinoethane, halogen atoms such as iodine, bromine, and chlorine, as well as carbon monoxide, hydrogen atoms, cyclopentadiene, cyclohexadiene, cyclooctadiene, cyclooctatetraene, indene, norbornadiene, benzene, cymene, phenol, 4-isopropyltoluene, cyclopentadienyl toluene, indenyl toluene, salicylidene, 2-methylpentene, 2-butene, allene, furan, and carboxylic acids. Furthermore, nitrogen based ligands and chalcogenite are also usable.

Of the ligands listed above, the hydrocarbon ligands may also comprise any of a variety of substituents, including alkyl groups (including C1 to C4 alkyl groups such as methyl groups and ethyl groups), alkenyl groups (including C2 to C5 alkenyl groups such as vinyl groups and allyl groups), alkynyl groups, alkoxy groups (including C1 to C4 alkoxy groups such as methoxy groups), alkoxycarbonyl groups (including C1 to C4 alkoxycarbonyl groups such as methoxycarbonyl groups), acyl groups (including C2 to C5 acyl groups such as acetyl groups), acyloxy groups (including C2 to C5 acyloxy groups such as formyl groups and acetyloxy groups), carboxyl groups, hydroxyl groups, amino groups, amide groups, imino groups, nitro groups, cyano groups, thioester groups, thioketone groups, thioether groups, and halogen atoms (such as chlorine and bromine). Specific examples of such substituted hydrocarbon ligands include cyclic hydrocarbon ligands that may be substituted with 1 to 5 methyl groups such as pentamethylcyclopentadienyl ligands.

Furthermore, in addition to the ligands described above, the transition metal complex may also contain a hydroxyl group, an alkoxy group (such as a methoxy, ethoxy, propoxy, or butoxy group), an acyl group (such as an acetyl or propionyl group), an alkoxycarbonyl group (such as a methoxycarbonyl or ethoxycarbonyl group), a β-diketone group such as acetylacetonate, a β-ketoester group such as acetylacetate, a pseudo-halogen group [such as a CN, thiocyanate (SCN), selenocyanate (SeCN), tellurocyanate (TeCN), $SCSN_3$, OCN, ONC, or azide ($N_3$) group], an oxygen atom, $H_2O$, or a nitrogen-containing compound [such as $NH_3$, NO, $NO_2$, $NO_3$, ethylenediamine, diethylenetriamine, tributylamine, 1,3-diisopropyl-4,5-dimethylimidazol-2-ylidine, pyridine, phenanthroline, diphenanthroline or substituted phenanthroline, 2,2':6',2"-terpyridine, pyridinimine, cross-linked aliphatic diamine, 4,4'-di(5-nonyl)-2,2'-bipyridine, bipyridine with coordinated thiocyanate, O, S, Se or Te, alkyliminopyridine, alkylbipyridinylamine, alkyl substituted tripyridine, di(alkylamino)alkylpyridine, ethylenediaminedipyridine, or tri(pyridinylmethyl)amine].

Using transition metal complexes with ruthenium as the central metal as representative examples, specific examples of the transition metal complex used in producing a copolymer of the present invention include dichlorotris(triphenylphosphine) ruthenium, dichlorotris(tributylphosphine) ruthenium, dichloro(trialkylphosphine)p-cymene ruthenium, dichloro-di(tricymenephosphine)styryl ruthenium, dichloro (cyclooctadiene) ruthenium, dichlorobenzene ruthenium, dichloro-p-cymene ruthenium, dichloro(norbornadiene) ruthenium, cis-dichlorobis(2,2'-bipyridine) ruthenium, dichlorotris(1,10-phenanthroline) ruthenium, carbonylchlorohydridotris(triphenylphosphine) ruthenium, chlorocyclopentadienylbis(triphenylphosphine) ruthenium, chloroindenylbis(triphenylphosphine) ruthenium, and dihydrotetrakis (triphenylphosphine) ruthenium, and of these, dichlorotris (triphenylphosphine) ruthenium, chloroindenylbis (triphenylphosphine) ruthenium, and dihydrotetrakis (triphenylphosphine) ruthenium are preferred. In addition, specific examples of other transition metal complexes include iron complexes such as di(triphenylphosphine) iron dichloride, di(tributylamino) iron dichloride, triphenylphosphine iron trichloride, (1-bromo)ethylbenzene-triethoxyphosphine iron dibromide, (1-bromo)ethylbenzene-triphenylphosphine iron dibromide, (1-bromo)ethylbenzene-[4,4'-di(5-nonyl)-2,2'-bipyridine] iron dibromide, (1-bromo)ethylbenzene-tri-n-butylamino iron dibromide, (1-bromo)ethylbenzene-tri-n-butylphosphine iron dibromide, tri-n-butylphosphine iron dibromide, [4,4'-di(5-nonyl)-2,2'-bipyridine] iron dibromide, tetraalkylammonium iron(II) trihalide, dicarbonylcyclopentadienyl iron(II) iodide, dicarbonylcyclopentadienyl iron(II) bromide, dicarbonylcyclopentadienyl iron(II) chloride, dicarbonylindenyl iron(II) iodide, dicarbonylindenyl iron(II) bromide, dicarbonylindenyl iron(II) chloride, dicarbonylfluorenyl iron(II) iodide, dicarbonylfluorenyl iron(II) bromide, dicarbonylfluorenyl iron(II) chloride, 1,3-diisopropyl-4,5-dimethylimidazol-2-ylidene iron chloride, and 1,3-diisopropyl-4,5-dimethylimidazol-2-ylidene iron bromide; ruthenium complexes such as dicarbonylcyclopentadienyl ruthenium(II) iodide, dicarbonylcyclopentadienyl ruthenium (II) bromide, dicarbonylcyclopentadienyl ruthenium(II) chloride, dicarbonylindenyl ruthenium(II) iodide, dicarbonylindenyl ruthenium(II) bromide, dicarbonylindenyl ruthenium(II) chloride, dicarbonylfluorenyl ruthenium(II) iodide, dicarbonylfluorenyl ruthenium(II) bromide, dicarbonylfluorenyl ruthenium(II) chloride, and dichloro-di-2,6-bis[(dimethylamino)-methyl]($\mu$-$N_2$)pyridine ruthenium (II); nickel complexes such as carbonylcyclopentadienyl nickel(II) iodide, carbonylcyclopentadienyl nickel(II) bromide, carbonylcyclopentadienyl nickel(II) chloride, carbonylindenyl nickel(II) iodide, carbonylindenyl nickel(II) bromide, carbonylindenyl nickel(II) chloride, carbonylfluorenyl nickel(II) iodide, carbonylfluorenyl nickel(II) bromide, carbonylfluorenyl nickel(II) chloride, o,o'-di(dimethylaminomethyl)phenyl nickel halide, di-triphenylphosphine nickel dibromide, di(tri-n-butylamino) nickel dibromide, 1,3-diaminophenyl nickel bromide, di(tri-n-butylphosphine) nickel dibromide, and tetra(triphenylphosphine) nickel; molybdenum complexes such as tricarbonylcyclopentadienyl molybdenum(II) iodide, tricarbonylcyclopentadienyl molybdenum(II) bromide, tricarbonylcyclopentadienyl molybdenum(II) chloride, di-N-aryl-di(2-dimethylaminomethylphenyl)lithium molybdenum, di-N-aryl(2-dimethylaminomethylphenyl)-methyl lithium molybdenum, di-N-aryl(2-dimethylaminomethylphenyl)-trimethylsilylmethyl lithium molybdenum, and di-N-aryl(2-dimethylaminomethylphenyl)-p-tolyl lithium molybdenum; tungsten complexes such as tricarbonylcyclopentadienyl tungsten(II) iodide, tricarbonylcyclopentadienyl tungsten(II) bromide, and tricarbonylcyclopentadienyl tungsten (II) chloride; cobalt complexes such as dicarbonylcyclopentadienyl cobalt (I); manganese complexes such as tricarbonylcyclopentadienyl manganese(I) and tricarbonyl (methylcyclopentadienyl) manganese(I); rhenium complexes such as tricarbonylcyclopentadienyl rhenium(I) and dioxobis (triphenylphosphine) rhenium iodide; rhodium complex salts such as tri(triphenylphosphine) rhodium chloride; palladium complexes such as triphenylphosphineacetyl palladium; copper complex salts of diphenanthroline, substituted diphenthroline, 2,2':6',2''-terpyridine, pyridinimine, or cross-linked aliphatic diamine, and copper complexes such as acetyl[4-4'-di(5-nonyl)-2,2'-bipyridine] copper, hexafluorophosphine-di[4-4'-di(5-nonyl)-2,2'-bipyridine] copper, copper thiocyanate, bipyridine copper with coordinated O, S, Se, or Te, and copper with coordinated alkylbipyridinylamine, alkyl substituted tripyridine, di(alkylamino)alkylpyridine, iminodipyridine, ethylenediaminedipyridine, or tri(pyridinylmethyl)amine. Of these, dicarbonylcyclopentadienyl iron (II) iodide, dicarbonylcyclopentadienyl ruthenium(II) iodide, and carbonylcyclopentadienyl nickel(II) iodide and the like are preferred. These transition metal complexes can be used either singularly, or in combinations of two or more different complexes.

The organohalogen compound used in the production of a copolymer of the present invention includes compounds comprising from 1 to 4, or even more, halogen atoms (such as fluorine, chlorine, bromine, and iodine). This organohalogen compound functions as an initiator for initiating the polymerization reaction by interacting with the transition metal complex to generate radicals. This type of organohalogen compound can be used either singularly, or in a combination of two or more different compounds. There are no particular restrictions on the organohalogen compound, although suitable examples include the halogen compounds represented by the formulas (VII) and (VIII) shown below.

In these formulas, the groups $R_{14}$ and $R_{15}$ may be either the same or different, and each represent a hydrogen atom, alkyl group, cycloalkyl group, aryl group, aralkyl group, or an organic group containing a hetero atom. The group $R_{16}$ represents an alkyl group, cycloalkyl group, aryl group, aralkyl group, or an organic group containing a hetero atom. The alkyl groups, cycloalkyl groups, aryl groups, aralkyl groups, or organic groups containing a hetero atom represented by $R_{14}$ to $R_{16}$ may contain substituent groups. The group $Z_1$ represents either a halogen atom or an organic group containing a halogen atom, and the group $Z_2$ represents either the same as $Z_1$ or the same as $R_{14}$ and $R_{15}$. Examples of suitable halogen atoms include fluorine, chlorine, bromine, and iodine, although chlorine, bromine, and iodine are particularly preferred. Specific examples of the above alkyl groups include C1 to C12 alkyl groups such as methyl groups, ethyl groups, n-propyl groups, isopropyl groups, n-butyl groups, isobutyl groups, sec-butyl groups, and t-butyl groups. Specific examples of the cycloalkyl groups include C4 to C12 cycloalkyl groups (and preferably C4 to C8 cycloalkyl groups) such as cyclopentyl groups, cyclohexyl groups, and cyclooctyl groups. Specific examples of the aryl groups include C6 to C12 aryl groups such as phenyl groups, tolyl groups, and naphthyl groups, and specific examples of the aralkyl groups include C7 to C14 aralkyl groups such as benzyl groups and phenethyl groups. Examples of the organic groups containing a hetero atom include organic groups containing at least one hetero atom (such as a nitrogen, oxygen, or sulfur atom), and specific examples include ester groups [including alkoxycarbonyl groups (including aliphatic C1 to C10 alkoxycarbonyl groups such as methoxycarbonyl groups, ethoxycarbonyl groups, propoxycarbonyl groups, and butoxycarbonyl groups; and C6 to C12 aryloxycarbonyl groups such as phenoxycarbonyl groups); acyloxy groups (including aliphatic C2 to C10 acyloxy groups such as acetyloxy groups and propionyloxy groups); and C6 to C12 arylcarbonyloxy groups such as benzoyloxy groups], ketone groups (including aliphatic C1 to C10 acyl groups such as formyl groups and acetyl groups; and C6 to C12 arylcarbonyl groups such as benzoyl groups), ether groups (including aliphatic C1 to C10 alkoxy groups such as methoxy groups and ethoxy groups; and C6 to C12 aryloxy groups such as phenoxy groups and naphthoxy groups), as well as carboxyl groups, hydroxyl groups, amino groups, amide groups, imino groups, cyano groups, nitro groups, thioester groups, thioketone groups, and thioether groups (such as alkyl sulfide groups and aryl sulfide groups). The non-halogen atoms of groups $R_{14}$ and $R_{15}$ may contain the same types of substituents allowed in the aforementioned hydrocarbon ligands.

Examples of preferred halogen compounds include halogenated hydrocarbons represented by the above formula (VII), halogenated esters (halogen-containing esters), halogenated ketones (halogen-containing ketones), and sulfonyl halides (halogenated sulfonyl compounds) represented by the above formula (V). Specific examples of halogenated hydrocarbons include haloalkanes [including C1 to C12 alkyl monohalides such as methyl chloride, methyl bromide, methyl iodide, ethyl chloride, ethyl bromide, ethyl iodide, n-propyl chloride, n-propyl bromide, n-propyl iodide, isopropyl chloride, isopropyl bromide, isopropyl iodide, t-butyl chloride, t-butyl bromide, and t-butyl iodide; C1 to C12 dihaloalkanes such as dichloromethane, dibromomethane, diiodomethane, 1,1-dichloroethane, 1,1-dibromoethane, 1,1-diiodoethane, 1-bromo-1-chloroethane, 2,2-dichloropropane, 2,2-dibromoproane, 2,2-diiodopropane, 2-chloro-2-iodopropane, and 2-bromo-2-iodopropane; cycloalkyl halides (including C5 to C10 cycloalkyl halides such as cyclohexyl chloride, and cyclooctyl chloride)], aryl halides (including C6 to C14 aryl halides such as chlorobenzene and dichlorobenzene), and aralkyl halides (including C7 to C14 aralkyl halides such as benzyl chloride, benzyl bromide, benzyl iodide, benzhydryl chloride, benzhydryl bromide, 1-phenylethyl chloride, 1-phenylethyl bromide, 1-phenylethyl iodide, xylylene dichloride, xylylene dibromide, xylylene diiodide, dichlorophenylmethane, and dichlorodiphenylmethane. Specific examples of halogen-containing esters include C1 to C10 alkyl esters, substituted alkyl esters, or alkenyl esters of halogen-containing C2 to C12 monocarboxylic acids (and preferably C1 to C4 alkyl esters of halogen-containing C4 to C8 monocarboxylic acids) such as methyl dichloroacetate, methyl trichloroacetate, methyl α-bromophenylacetate, ethyl 2-bromo-2-methylpropionate, hydroxyethyl 2-bromopropionate, glycidylmethyl 2-bromopropionate, propenyl 2-bromopropionate, vinyl chloroacetate, bromolactone, p-carboxyphenylethyl 2-bromopropionate, methyl 2-chloroisobutyrate, ethyl 2-chloroisobutyrate, methyl 2-bromoisobutyrate, ethyl 2-bromoisobutyrate, methyl 2-iodoisobutyrate, and ethyl 2-iodoisobutyrate; C1 to C10 alkyl esters of halogen-containing C1 to C14 polycarboxylic acids (and preferably C1 to C4 alkyl esters of halogen-containing C2 to C8 dicarboxylic acids) such as dimethyl 2-chloro-2-methylmalonate, diethyl 2-chloro-2-methylmalonate, dimethyl 2-bromo-2-methylmalonate, diethyl 2-bromo-2-methylmalonate, dimethyl 2-iodo-2-methylmalonate, diethyl 2-iodo-2-methylmalonate, and dimethyl 2-bromo-2,4,4-trimethylglutarate; and halogen-containing C2 to C12 carboxylic acids such as dichloroacetic acid, dibromoacetic acid, 2-chloroisobutyric acid, and 2-bromoisobutyric acid. Specific examples of halogen-containing ketones include halogenated C1 to C10 alkyl-C1 to C10 alkyl ketones such as 2-chloroacetone, 1,1-dichloroacetone, ethylchloro methyl ketone, and 1-bromoethyl ethyl ketone; and halogenated C1 to C10 alkyl-C6 to C12 aryl ketones such as 2,2-dichloroacetophenone and 2-bromoisobutyrophenone. Specific examples of halogen-containing nitriles include 2-bromopropionitrile, and benzyl thiocyanate, which can also be considered a part of this series. In addition to the halogen compounds represented by the above formula (VII), organohalogen compounds containing 3 or 4 halogen atoms can also be used as reaction initiators. Examples of compounds containing 3 halogen atoms include C1 to C12 trihaloalkanes such as chloroform, C7 to C14 aralkyl trihalides such as trichlorophenylmethane, C1 to C10 alkyl esters of halogen-containing C2 to C12 monocarboxylic acids such as acetyltrichloromethane, and halogenated C1 to C10 alkyl-C1 to C10 alkyl ketones such as 1,1,1-trichloroacetone, whereas examples of compounds containing 4 halogen atoms include C1 to C12 tetrahaloalkanes such as carbon tetrachloride and bromotrichloromethane. Even compounds with more than 4 halogen atoms such as trifluorotrichloroethane can be used.

Specific examples of sulfonyl halides represented by the above formula (VIII) include aliphatic sulfonyl chlorides (and particularly alkanesulfonyl halides such as methanesulfonyl halides) such as methanesulfonyl chloride, methanesulfonyl bromide, methanesulfonyl iodide, chloromethanesulfonyl chloride, chloromethanesulfonyl bromide, chloromethanesulfonyl iodide, dichloromethanesulfonyl chloride, dichloromethanesulfonyl bromide, dichloromethanesulfonyl iodide, bromomethanesulfonyl chloride, bromomethanesulfonyl bromide, bromomethanesulfonyl iodide, dibromomethanesulfonyl chloride, dibromomethanesulfonyl bromide, dibromomethanesulfonyl iodide, iodomethanesulfonyl chloride, iodomethanesulfonyl bromide, iodomethanesulfonyl iodide, diiodomethanesulfonyl chloride, diiodomethanesulfonyl bromide, diiodomethanesulfonyl iodide, and trichloromethanesulfonyl chloride; and aromatic sulfonyl halides such as benzenesulfonyl chloride, benzenesulfonyl bromide, benzenesulfonyl iodide, p-methylbenzenesulfonyl chloride, p-methylbenzenesulfonyl bromide, p-methylbenzenesulfonyl iodide, p-chlorobenzenesulfonyl chloride, p-chlorobenzenesulfonyl bromide, p-chlorobenzenesulfonyl iodide, p-methoxybenzenesulfonyl chloride, p-methoxybenzenesulfonyl bromide, p-methoxybenzenesulfonyl iodide, p-nitrobenzenesulfonyl chloride, p-nitrobenzenesulfonyl bromide, p-nitrobenzenesulfonyl iodide, p-fluorobenzenesulfonyl chloride, p-carboxybenzenesulfonyl chloride, p-aminodiazobenzenesulfonyl chloride, 2,5-dichlorobenzenesulfonyl chloride, 2,5-dimethoxybenzenesulfonyl chloride, 2-hydroxy-3,5-dichlorobenzenesulfonyl chloride, 1-naphthalenesulfonyl chloride, 2-naphthalenesulfonyl chloride, (5-amino-2-naphthalene)sulfonyl chloride, 1,4-disulfonylchloride benzene, 1,4-disulfonyldibromide benzene, 1,4-disulfonyldiiodide benzene, 2,6-disulfonyldichloride naphthalene, 2,6-disulfonyldibromide naphthalene, and 2,6-disulfonyldiiodide naphthalene. In addition, examples of other halogen compounds that contain hetero atoms include halogenated alcohols (including halogenated C1 to C10 aliphatic, alicyclic, and aromatic alcohols such as 2,2-dichloroethanol and 2,2-dibromoethanol), halogenated nitriles (including halogenated nitriles such as dichloroacetonitrile and dibromoacetonitrile), halogenated aldehydes, and halogenated amides.

In a living radical polymerization, a Lewis acid and/or an amine, which act as activating agents by acting upon the metal complex to accelerate the radical polymerization, can also be added. Such Lewis acids and amines can be used either singularly, or in combinations of two or more different compounds. There are no particular restrictions on the type of Lewis acid used, and suitable examples include the Lewis acids represented by the formulas (IX) and (X) shown below.

In these formulas, $M_1$ represents an element from either group 3 or group 13 of the periodic table, and $M_2$ represents an element from either group 4 or group 14 of the periodic table. The groups $R_{17}$ to $R_{20}$ may be either the same or different, and each represent a halogen atom, or an alkyl group, cycloalkyl group, aryl group, aralkyl group, alkoxy group, cycloalkyloxy group, aryloxy group, or aralkyloxy group. Specific examples of the aforementioned $M_1$ include elements from group 3 of the periodic table such as scandium Sc and yttrium Y, and elements from group 13 of the periodic table such as boron B, aluminum Al, gallium Ga, and indium In, and of these, Sc, B, and Al are preferred, and Sc and Al are particularly desirable. Specific examples of the aforementioned $M_2$ include elements from group 4 of the periodic table such as titanium Ti, zirconium Zr, and hafnium Hf, and elements from group 14 of the periodic table such as silicon Si, tin Sn, and lead Pb, and of these, Ti, Zr, and Sn are preferred.

In the case of the groups $R_{17}$ to $R_{20}$, specific examples of the alkyl groups include C1 to C12 alkyl groups such as methyl groups, ethyl groups, n-propyl groups, isopropyl groups, n-butyl groups, isobutyl groups, and t-butyl groups, specific examples of the cycloalkyl groups include C4 to C12 cycloalkyl groups (and preferably C4 to C8 cycloalkyl groups) such as cyclopentyl groups, cyclohexyl groups, and cyclooctyl groups, specific examples of the aryl groups include C6 to C12 aryl groups such as phenyl groups, tolyl groups, and naphthyl groups, and specific examples of the aralkyl groups include C7 to C14 aralkyl groups such as benzyl groups and phenethyl groups. Furthermore, specific examples of the cycloalkyloxy groups include C4 to C12 cycloalkyloxy groups (and preferably C4 to C8 cycloalkyloxy groups) such as cyclopentyloxy groups, cyclohexyloxy groups, and cyclooctyloxy groups, and specific examples of the aralkyloxy groups include C7 to C14 aralkyloxy groups such as benzyloxy groups and phenethyloxy groups.

Those groups $R_{17}$ to $R_{20}$ that are not halogen atoms may contain the same types of substituents allowed in the aforementioned hydrocarbon ligands. For example, aryloxy groups may contain a substituent group such as one or more C1 to C5 alkyl groups on the aromatic ring. Specific examples of such substituted aryloxy groups include 2-methylphenoxy groups, 3-methylphenoxy groups, 4-methylphenoxy groups, 2-ethylphenoxy groups, 3-ethylphenoxy groups, 4-ethylphenoxy groups, 2,6-dimethylphenoxy groups, 2,6-diethylphenoxy groups, 2,6-diisopropylphenoxy groups, 2,6-di-n-butylphenoxy groups, and 2,6-di-t-butylphenoxy groups. Preferred groups for $R_{17}$ to $R_{20}$ include halogen atoms such as chlorine, bromine, and iodine, alkyl groups, and alkoxy groups such as ethoxy groups, isopropoxy groups, n-butoxy groups, s-butoxy groups, and t-butoxy groups.

Specific examples of the compounds represented by the above formula (IX) include aluminum-based Lewis acids such as aluminum alkoxides [including C1 to C4 alkoxides or aryloxides of aluminum such as aluminum triethoxide, aluminum triisopropoxide, aluminum tri-s-butoxide, aluminum tri-t-butoxide, and aluminum triphenoxide; and alkylaluminum aryloxides such as methylaluminum bis(2,6-di-t-butylphenoxide), ethylaluminum bis(2,6-di-t-butylphenoxide), and methylaluminum bis(2,6-di-t-butyl-4-methylphenoxide)], and aluminum halides (including aluminum trihalides such as aluminum trichloride, aluminum tribromide, and aluminum triiodide); and the scandium-based Lewis acids that correspond with the above aluminum-based Lewis acids (including scandium alkoxides such as scandium triisopropoxide, and scandium halides such as scandium trichloride, scandium tribromide, and scandium triiodide).

Specific examples of the compounds represented by the above formula (X) include titanium-based Lewis acids, including titanium alkoxides (such as titanium tetramethoxide, titanium tetraethoxide, titanium tetra-n-propoxide, titanium tetraisopropoxide, titanium tetra-n-butoxide, titanium tetra-t-butoxide, titanium tetraphenoxide, chlorotitanium triisopropoxide, dichlorotitanium diisopropoxide, and trichlorotitanium isopropoxide); titanium halides (such as titanium tetrachloride, titanium tetrabromide, and titanium tetraiodide); zirconium-based Lewis acids that correspond with the above titanium-based Lewis acids (including zirconium alkoxides such as zirconium tetraethoxide, zirconium tetra-n-propoxide, zirconium tetraisopropoxide, zirconium tetra-n-butoxide, and zirconium tetra-t-butoxide, and zirconium halides such as zirconium tetrachloride, zirconium tetrabromide, and zirconium tetraiodide); and tin-based Lewis acids that correspond with the above titanium-based Lewis acids (including tin alkoxides such as tin tetraisopropoxide and tin halides such as tin tetrachloride, tin tetrabromide, and tin tetraiodide).

Of these compounds, preferred Lewis acids include metal compounds (and particularly metal alkoxides) in which the metal is selected from a group consisting of aluminum, scandium, titanium, zirconium, and tin, and specific examples of preferred compounds include aluminum alkoxides (such as aluminum triethoxide, aluminum triisopropoxide, aluminum tri-s-butoxide, and aluminum tri-t-butoxide), scandium alkoxides (such as scandium triisopropoxide), titanium alkoxides (such as titanium tetramethoxide, titanium tetraethoxide, titanium tetraisopropoxide, titanium tetra-n-butoxide, titanium tetra-t-butoxide, and titanium tetraphenoxide), zirconium alkoxides (such as zirconium tetraisopropoxide), and tin alkoxides (such as tin tetraisopropoxide).

Furthermore, there are no particular restrictions on the type of amine that can be used, and any nitrogen-containing compound can be used, including secondary amines, tertiary amines, and nitrogen-containing aromatic heterocyclic compounds, although secondary amines and tertiary amines are preferred. Specific examples of suitable secondary amines include dimethylamine, diethylamine, di-n-propylamine, diisopropylamine, di-n-butylamine, pyrrolidine, piperidine, 2,2,6,6-tetramethylpiperidine, piperazine, and morpholine, whereas specific examples of suitable tertiary amines include trimethylamine, triethylamine, tri-n-propylamine, tri-n-butylamine, diisopropylethylamine, N,N,N',N'-tetramethylethylenediamine, 1,5-diazabicyclo[4,3,0]non-5-ene, 1,4-diazabicyclo[2,2,2]octane, and 1,8-diazabicyclo[5,4,0]undec-7-ene. Furthermore, compounds containing two or more of a primary amine portion, a secondary amine portion, and a tertiary amine portion within the one molecule can also be used. Specific examples of such compounds include diethylenetriamine, triethylenetetramine, tetraethylpentamine, and 4-(2-aminoethyl)piperidine. The ratio between the transition metal complex and the Lewis acid or amine is typically within a range from former/latter=0.05/1 to 10/1 (molar ratio), and preferably from 0.1/1 to 5/1 (molar ratio).

Furthermore, living radical polymerization can also be conducted using stable radicals. Examples of such stable radicals include mixtures of a stable free radical compound and a radical polymerization initiator, or any of the various alkoxyamines.

A stable free radical compound is one that can exist alone as a stable free group at room temperature or under the polymerization conditions, or is able to react with a growing, non-terminated radical during a polymerization reaction, generating a bond that is capable of re-dissociating. Specific examples include compounds capable of generating one or more nitroxide radicals or hydrazyl radicals such as 2,2,6,6-tetramethyl-1-piperidinyloxy (TEMPO), 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy, 4,4'-dimethyl-1,3-oxazolin-3-yloxy, 2,2,5,5-tetramethyl-1-pyrrolidinyloxy, di-t-butylnitroxide, and 2,2-di(4-t-octylphenyl)-1-picrylhydrazyl.

The radical polymerization initiator can be any compound that undergoes decomposition to generate free radicals, and specific examples include azo compounds such as 2,2'-azobisisobutyronitrile, 2,2'-azobis-(2,4-dimethylvaleronitrile), diacyl peroxides such as benzoyl peroxide, ketone peroxides such as methyl ethyl ketone peroxide, peroxyketals such as 1,1-bis(t-butylperoxy)-3,3,5-trimethylcyclohexane, hydroperoxides such as cumene hydroperoxide, dialkyl peroxides such as dicumyl peroxide, and organic peroxides of peroxyesters such as t-butyl peroxypivalate and t-butyl peroxybenzoate. Furthermore, conventional polymerization accelerators such as dimethylaniline or cobalt naphthenate that are commonly combined with organic peroxides can also be used.

The radical polymerization initiator is typically used in a quantity equivalent to 0.05 to 5 mols, and preferably from 0.2 to 2 mols, per 1 mol of the aforementioned stable free radical compound.

Examples of alkoxyamines include those compounds disclosed on page 107 of "Handbook of Radical Polymerization", NTS Co., Ltd., and those disclosed in J. Am. Chem. Soc., 1999, 121, 3904, and of these, the compounds shown below are particularly preferred.

Specific examples of methods of producing a copolymer using a living radical polymerization include the following methods:

(1) a method in which the monomers are added sequentially, wherein once the conversion ratio of the first monomer has reached 100%, the second monomer is added to complete the polymerization, and this process is then repeated, thus generating a block copolymer, (2) a method in which the second monomer is added, and the polymerization is continued, once the degree of polymerization or the molecular weight has reached a target value, regardless of whether or not the conversion ratio of the first monomer has reached 100%, thus generating a gradient copolymer in which random portions exist between the block chains, and (3) a method in which once the degree of polymerization or the molecular weight has reached a target value, regardless of whether or not the conversion ratio of the first monomer has reached 100%, the reaction is halted, and the polymer is removed from the system and added to another monomer as a macroinitiator, thus allowing a copolymerization to proceed intermittently, generating a block copolymer.

There are no particular restrictions on the polymerization method, and conventional methods such as bulk polymerization, solution polymerization, suspension polymerization, or emulsion polymerization can be employed, although solution polymerization is particularly desirable. In those cases where a solution polymerization is used, there are no particular restrictions on the solvent, and suitable solvents include aromatic hydrocarbons (such as benzene, toluene, and xylene), alicyclic hydrocarbons (such as cyclohexane), aliphatic hydrocarbons (such as hexane and octane), ketones (such as acetone, methyl ethyl ketone, and cyclohexanone), ethers (such as tetrahydrofuran and dioxane), esters (such as ethyl acetate and butyl acetate), amides (such as N,N-dimethylformamide and N,N-dimethylacetamide), sulfoxides (such as dimethyl sulfoxide), alcohols (such as methanol and ethanol), and polyhydric alcohol derivatives (such as ethylene glycol monomethyl ether and ethylene glycol monomethyl ether acetate). These solvents can be used either singularly, or in mixtures of two or more different solvents. The polymerization is typically conducted either under vacuum or in an inert gas atmosphere such as nitrogen or argon, at a temperature within a range from 0 to 200° C., and preferably from 40 to 150° C., and at either normal pressure or under pressurized conditions.

A living anionic polymerization is typically conducted using an alkali metal or an organoalkali metal as the polymerization initiator, either under vacuum or in an inert gas atmosphere such as nitrogen or argon, in an organic solvent, and at a temperature within a range from −100 to 50° C., and preferably from −100 to −20° C. Examples of suitable alkali metals include lithium, potassium, sodium, and cesium, whereas examples of suitable organoalkali metals include alkylated, allylated, or arylated compounds of the above alkali metals. Specific examples include n-butyllithium, sec-butyllithium, t-butyllithium, ethylsodium, lithium biphenyl, lithium naphthalene, lithium triphenyl, sodium naphthalene, α-methylstyrene dianion, 1,1-diphenylhexyllithium, and 1,1-diphenyl-3-methylpentyllithium.

Suitable organic solvents include the types of organic solvents typically used in anionic polymerizations, including aromatic hydrocarbons (such as benzene, toluene, and xylene), aliphatic hydrocarbons (such as hexane and octane), alicyclic hydrocarbons (such as cyclohexane and cyclopentane), ketones (such as acetone, methyl ethyl ketone, and cyclohexanone), ethers (such as tetrahydrofuran, dioxane, ethylene glycol dimethyl ether, and diethylene glycol dimethyl ether), anisole, and hexamethyl phosphoramide. Furthermore, other conventional additives, including the alkali metal salts or alkali earth metal salts of mineral acids such as lithium chloride and the like, can also be used for controlling the copolymerization reaction.

In those cases where a compound containing an active hydrogen atom such as a hydroxyl group or a carboxyl group is used in a living anionic polymerization, the active hydrogen atom is first protected using a conventional protective reaction such as a silylation or a conversion to an acetal or BOC group, the polymerization reaction is conducted, and then following polymerization, a deprotection reaction is conducted using either acid or alkali.

Progress of the copolymerization reaction, or confirmation of completion of the reaction, can be ascertained easily using techniques such as gas chromatography, liquid chromatography, gel permeation chromatography, membrane osmometry, or NMR. Following completion of the copolymerization reaction, the copolymer can be obtained via typical separation and purification methods such as column purification, or by adding the crude product to water or another poor solvent, and then filtering off and drying the precipitated polymer component.

3) Polymer Electrolyte of the Present Invention

A polymer electrolyte of the present invention comprises a copolymer described above, and an electrolyte salt. The copolymer can use a mixture of two or more copolymers with different structural units.

There are no particular restrictions on the electrolyte salt used in the present invention, and an electrolyte comprising the ion identified as the most desirable charge carrier can be used, although electrolytes that display a large dissociation constant within the solid polymer electrolyte produced on curing are preferred. Suitable examples include alkali metal salts, quaternary ammonium salts such as $(CH_3)_4NBF_6$, quaternary phosphonium salts such as $(CH_3)_4PBF_6$, transition metal salts such as $AgClO_4$, or protonic acids such as hydrochloric acid, perchloric acid, and fluoroboric acid, and of these, alkali metal salts, quaternary ammonium salts, quaternary phosphonium salts, and transition metal salts are preferred.

Specific examples of suitable electrolyte salts include conventional alkali metal salts such as $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $KPF_6$, $Mg(ClO_4)_2$, and $Mg(BF_4)_2$, and these electrolyte salts may be used either singularly, or in mixtures of two or more different salts. Of the above electrolyte salts, lithium salts are particularly preferred.

The quantity added of the electrolyte salt is typically within a range from 0.005 to 80 mol %, and preferably from 0.01 to 50 mol %, relative to the quantity of alkylene oxide units within the copolymer. A polymer electrolyte of the present invention can be produced by adding, and mixing (complexing) an electrolyte salt with an aforementioned copolymer. There are no particular restrictions on the method used for this addition and complexing process, and suitable methods include a method in which the copolymer and the electrolyte salt are dissolved in a suitable solvent such as tetrahydrofuran, methyl ethyl ketone, acetonitrile, ethanol, or dimethylformamide, and a method in which the copolymer and the electrolyte salt are mixed together mechanically, either at room temperature or under heat.

Molding the aforementioned solid polymer electrolyte into sheet, membrane, or film form is particularly desirable, and by so doing, the degree of freedom of the processed surface increases, which provides significant practical benefits. The sheet-like solid polymer electrolyte can be produced by any of a variety of coating techniques including roll coating, curtain coating, spin coating, dipping, or casting, and using one of these techniques, a film of the solid polymer electrolyte is formed on the surface of a substrate, and the substrate is subsequently removed to yield the solid polymer electrolyte sheet.

A solid polymer electrolyte of the present invention contains a copolymer comprising block chains A, B, and C. In the composition, the block chain A, because it contains a repeating unit represented by the formula (I), can be considered as the polymer segment (P1) that displays ionic conductivity, the block chain B, because it contains a repeating unit represented by the formula (II), can be considered as a polymer segment (P2) that displays no ionic conductivity, and the block chain C of a preferred embodiment, which contains a repeating unit represented by the formula (III), is also a polymer segment (P2) that displays no ionic conductivity, and in those cases where the block chains are represented by each of these polymer segments, the copolymer is a polymer in which the segments are arranged in a P2, P1, P2 sequence.

A solid polymer electrolyte of the present invention functions as an ion conductive film, and this film comprises a polymer containing a polymer segment (P1) that displays ionic conductivity, and a polymer segment (P2) that displays no ionic conductivity, wherein the film comprises P1 microdomains and P2 microdomains that form a microphase separated structure.

Furthermore, this microphase separated structure within the ion conductive film is preferably a network-type microphase separated structure. By ensuring such a structure, the ionic conductivity, the physical characteristics, the thermal characteristics, and particularly the film strength, can all be improved.

BEST MODE FOR CARRYING OUT THE INVENTION

As follows is a more detailed description of the present invention using a series of examples, although the present invention is in no way restricted to the examples presented below.

EXAMPLE 1

Solid Polymer Electrolyte Comprising a B-A-B Type Multi-Branched Polymer Compound in which the Block Chain a is Poly-Methoxypolyethylene Glycol Monomethacrylate, and the Block Chain B is Polystyrene (1) Synthesis of the Block Chain A To 89.40 g of toluene under an argon atmosphere were added 0.05 g (0.05 mmol) of dichlorotris(triphenylphosphine)ruthenium and 22.35 g (20.0 mmol) of methoxypolyethylene glycol monomethacrylate (Blemer PME-1000, a compound of the aforementioned formula (IV) wherein m=23, manufactured by NOF Corporation), and following mixing to generate a homogeneous solution, 0.03 g (0.2 mmol) of di-n-butylamine and 0.02 g (0.1 mmol) of 2,2-dichloroacetophenone were added. The resulting mixture was then heated to 80° C. under constant stirring to initiate the polymerization reaction. Following reaction for 22 hours from the point of reaction initiation, the polymerization reaction was halted by cooling the polymerization reaction system to 0° C. The polymerization ratio was 55.0%. The polymerization solution was then purified by passage through a column to remove the metal complex and any unreacted monomers, and the toluene was then removed under reduced pressure, yielding poly-methoxypolyethylene glycol monomethacrylate (hereafter abbreviated as P-PME1000-1). The resulting P-PME1000-1 was a single peak polymer with a number average molecular weight (Mn) of 122,500.

(2) Synthesis of a B-A-B Type Multi-Branched Polymer Compound

To 20.37 g of toluene under an argon atmosphere were added 0.01 g (0.01 mmol) of chloropentamethylcyclopentadienyl-bis(triphenylphosphine)ruthenium, 6.13 g (0.05 mmol) of P-PME1000-1, 2.60 g (25 mmol) of styrene, and 0.57 g (5.0 mmol) of n-octane, and following mixing to generate a homogeneous solution, 0.01 g (0.1 mmol) of di-n-butylamine was added, and the resulting mixture was heated to 100° C. under constant stirring to initiate the polymerization reaction. Following reaction for 22 hours from the point of reaction initiation, the polymerization reaction was halted by cooling the polymerization reaction system to 0° C. The styrene polymerization ratio was 26%. The polymerization solution was then purified by passage through a column to remove the metal complex and any unreacted monomers, and the toluene was then removed under reduced pressure, yielding a multi-branched polymer compound with a poly-(styrene-b-PME-1000-b-styrene) type structure in which the methoxypolyethylene glycol acted as a graft chain. The thus obtained multi-branched polymer compound was a single peak polymer with a ratio between the block chain A and the block chain B of A/B=2.06/1 (degree of polymerization ratio), and Mn=135,000. Furthermore, the thus obtained multi-branched polymer compound was dissolved in acetone and used to generate a film, and inspection of the cross-section of this film under a transmission electron microscope (TEM) revealed a network-type microphase separated structure.

(3) Preparation, and Evaluation of the Properties of a Solid Polymer Electrolyte Film 1 g of the multi-branched polymer compound obtained by the process described above was dissolved in 25 ml of acetone under an argon atmosphere, and 0.09 g of $LiClO_4$ as an electrolyte salt was then added to the resulting solution and dissolved to generate a homogeneous solution. The solution was then spread onto a Teflon (registered trademark) substrate, allowed to stand for 24 hours at room temperature, and was then dried under reduced pressure at 60° C. for 24 hours, thus generating a uniform solid electrolyte film (film thickness 140 μm). Under an argon atmosphere, this film was then sandwiched between platinum plates, and an impedance analyzer of frequency 5 Hz to 10 MHz (Solartron-1260) was used to measure the ionic conductivity by complex impedance analysis. The measurement revealed an ionic conductivity at 23° C. of $3.8 \times 10^{-4}$ S/cm.

Figure 1:
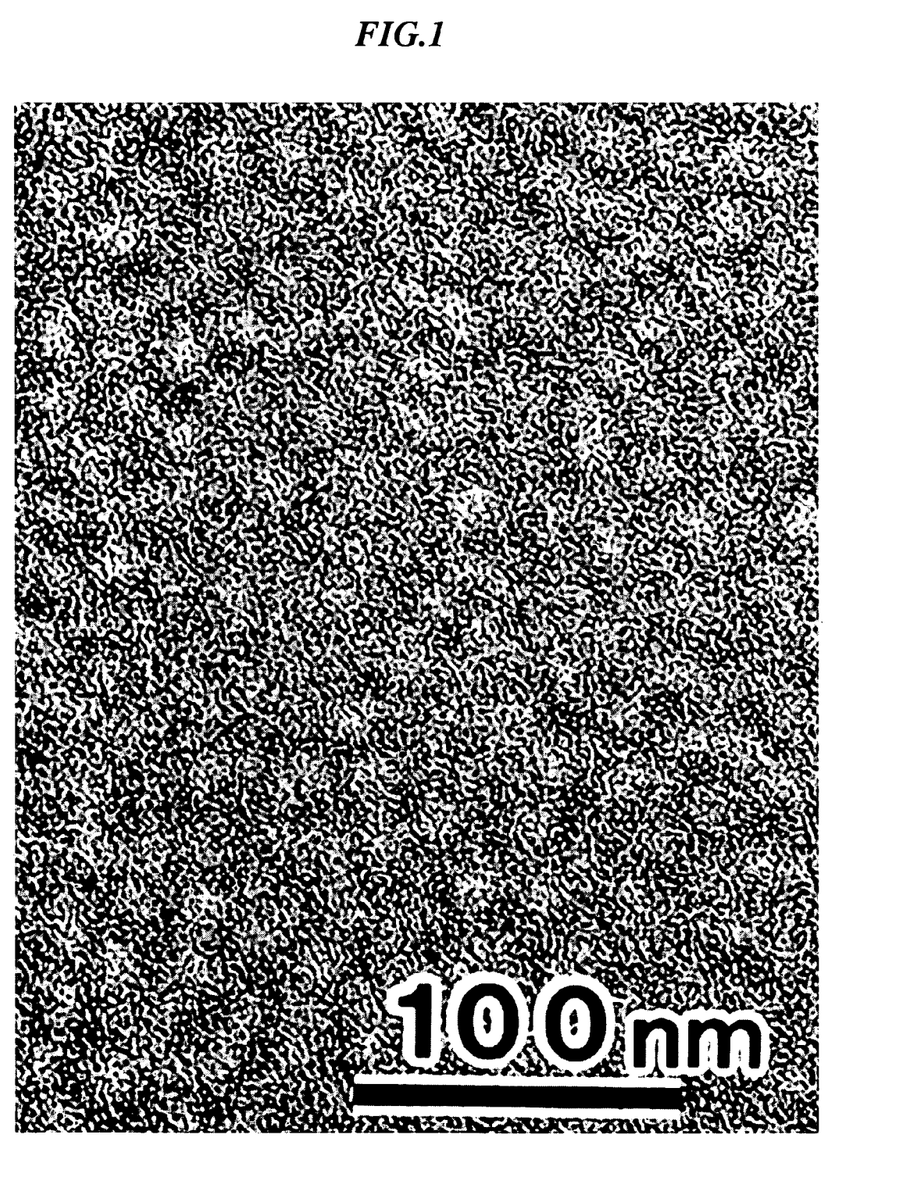
FIG. 1 is a transmission electron microscope photograph showing a cross-section of an electrolyte film comprising a B-A-B type multi-branched polymer compound according to the present invention.

Furthermore, the cross-section of the thus obtained solid polymer electrolyte was also inspected using a transmission electron microscope (TEM). The resulting photograph is shown in FIG. 1. From FIG. 1 it is evident that the structure within the film is a network-type microphase separated structure.

EXAMPLE 2

Solid Polymer Electrolyte Comprising a B-A-B Type Multi-Branched Polymer Compound in which the Block Chain a is Poly-Methoxypolyethylene Glycol Monomethacrylate, and the Block Chain B is Polystyrene (1) Synthesis of the Block Chain A To 115.80 g of toluene under an argon atmosphere were added 0.10 g (0.1 mmol) of dichlorotris(triphenylphosphine) ruthenium and 28.95 g (26.0 mmol) of Blemer PME-1000, and following mixing to generate a homogeneous solution, 0.05 g (0.4 mmol) of di-n-butylamine and 0.04 g (0.2 mmol) of 2,2-dichloroacetophenone were added. The resulting mixture was then heated to 80° C. under constant stirring to initiate the polymerization reaction. Following reaction for 48 hours from the point of reaction initiation, the polymerization reaction was halted by cooling the polymerization reaction system to 0° C. The polymerization ratio was 50%. The polymerization solution was then purified by passage through a column to remove the metal complex and any unreacted monomers, and the toluene was then removed under reduced pressure, yielding poly-methoxypolyethylene glycol monomethacrylate (hereafter abbreviated as P-PME1000-2). The resulting P-PME1000-2 was a single peak polymer with a number average molecular weight (Mn) of 70,000 (a degree of polymerization of 63).

(2) Synthesis of a B-A-B Type Multi-Branched Polymer Compound

To 32.62 g of toluene under an argon atmosphere were added 0.02 g (0.02 mmol) of chloropentamethylcyclopentadienyl-bis(triphenylphosphine)ruthenium, 7.00 g (0.10 mmol) of P-PME1000-2, 6.98 g (67 mmol) of styrene, and 0.57 g (5.0 mmol) of n-octane, and following mixing to generate a homogeneous solution, 0.03 g (0.2 mmol) of di-n-butylamine was added, and the resulting mixture was heated to 100° C. under constant stirring to initiate the polymerization reaction. Following reaction for 45 hours from the point of reaction initiation, the polymerization reaction was halted by cooling the polymerization reaction system to 0° C. The styrene polymerization conversion ratio was 57%. The polymerization solution was then purified by passage through a column to remove the metal complex and any unreacted monomers, and the solvent was then removed under reduced pressure, yielding a multi-branched polymer compound with a poly-(styrene-b-PME-1000-b-styrene) type structure in which the methoxypolyethylene glycol acted as a graft chain. The thus obtained multi-branched polymer compound was a single peak polymer with a ratio between the block chain A and the block chain B of A/B=1/6 (degree of polymerization ratio), and Mn=108,000.

(3) Preparation, and Evaluation of the Properties of a Solid Polymer Electrolyte Film With the exception of using 0.07 g of $LiClO_4$, a uniform solid electrolyte film was prepared in the same manner as the example 1, and the ionic conductivity was measured. The measurement revealed an ionic conductivity at 23° C. of $5 \times 10^{-5}$ S/cm. Furthermore, inspection of the thus prepared film using a transmission electron microscope revealed a similar network-type microphase separated structure to that of the solid polymer electrolyte obtained in the example 1.

EXAMPLE 3

Solid Polymer Electrolyte Comprising a B-A-B Type Multi-Branched Polymer Compound in which the Block Chain A is Poly-Methoxypolyethylene Glycol Monomethacrylate, and the Block Chain B is Polystyrene (1) Synthesis of the Block Chain A To 69.53 g of toluene under an argon atmosphere were added 0.05 g (0.5 mmol) of copper (I) chloride, 0.16 g (1.0 mmol) of bipyridine, and 29.80 g (60 mmol) of methoxypolyethylene glycol monomethacrylate (Blemer PME-400, a compound of the aforementioned formula (IV) wherein m=9, manufactured by NOF Corporation), and following mixing to generate a homogeneous solution, 0.09 g (0.5 mmol) of 2,2-dichloroacetophenone was added, and the resulting mixture was then heated to 80° C. under constant stirring to initiate the polymerization reaction. Following reaction for 40 hours from the point of reaction initiation, the polymerization reaction was halted by cooling the polymerization reaction system to 0° C. The polymerization conversion ratio was 90%. 500 ml of THF was then added to the reaction solution, excess magnesium sulfate was added, and following filtering, the filtrate was purified by passage through a column to remove the metal complex and any unreacted monomers. The solvent was then removed under reduced pressure, yielding poly-methoxypolyethylene glycol monomethacrylate (hereafter abbreviated as P-PME400). The resulting P-PME400 was a single peak polymer with Mn=55,000 (a degree of polymerization of 110).

(2) Synthesis of a B-A-B Type Multi-Branched Polymer Compound

To 14.58 g of toluene under an argon atmosphere were added 0.01 g (0.1 mmol) of copper (I) chloride, 0.03 g (0.2 mmol) of bipyridine, 5.00 g (0.09 mmol) of P-PME400, 1.25 g (12 mmol) of styrene, and 0.11 g (1.0 mmol) of n-octane, and following mixing to generate a homogeneous solution, the resulting mixture was heated to 100° C. under constant stirring to initiate the polymerization reaction. Following reaction for 25 hours from the point of reaction initiation, the polymerization reaction was halted by cooling the polymerization reaction system to 0° C. The styrene polymerization conversion ratio was 70%. The reaction solution was then purified by passage through a column to remove the metal complex, and the solvent was then removed under reduced pressure, yielding a multi-branched polymer compound with a poly-(styrene-b-PME-400-b-styrene) type structure in which the methoxypolyethylene glycol acted as a graft chain. The thus obtained multi-branched polymer compound was a single peak polymer with a ratio between the block chain A and the block chain B of A/B=1.2/1 (degree of polymerization ratio), and Mn=65,000.

(3) Preparation, and Evaluation of the Properties of a Solid Polymer Electrolyte Film With the exception of using 0.08 g of LiClO$_4$, the ionic conductivity was measured in the same manner as the example 1. The measurement revealed an ionic conductivity at 23° C. of 1×10$^{-4}$ S/cm. Furthermore, inspection of the thus prepared film using a transmission electron microscope revealed a similar network-type microphase separated structure to that of the solid polymer electrolyte obtained in the example 1.

EXAMPLE 4

Solid Polymer Electrolyte Comprising a B-A-C Type Multi-Branched Polymer compound in which the Block Chain A is Poly-Methoxypolyethylene Glycol Monoacrylate, the Block Chain B is Polystyrene, and the Block Chain C is Isobornyl Acrylate (1) Synthesis of the Block Chain B To 48 g of toluene that had already undergone argon degassing treatment were added, under an argon atmosphere, 0.02 g (0.02 mmol) of chloropentamethylcyclopentadienyl-bis(triphenylphosphine)ruthenium, 20.8 g (200 mmol) of styrene, and 0.57 g (5 mmol) of n-octane, and following mixing to generate a homogeneous solution, 0.08 g (0.4 mmol) of aluminum isopropoxide and 0.08 g (0.4 mmol) of 2-bromo isobutyrate were added and mixed to form a homogeneous solution, and the resulting solution was heated to 100° C. under constant stirring to initiate the polymerization reaction. Following reaction for 50 hours from the point of reaction initiation, the polymerization reaction was halted by cooling the polymerization reaction system to 0° C. The styrene polymerization conversion ratio was 50%. The polymerization solution was then purified by passage through a column to remove the metal complex and any unreacted monomers, and the volatile fraction was then removed under reduced pressure, yielding polystyrene. The thus obtained polystyrene was a single peak polymer with Mn=25,000.

(2) Synthesis of a B-A Type Multi-Branched Polymer Compound

To 68 g of toluene under an argon atmosphere were added 0.02 g (0.02 mmol) of chloropentamethylcyclopentadienyl-bis(triphenylphosphine)ruthenium, 2.5 g (0.1 mmol) of the polystyrene obtained in (1) above, and 27.1 g (55 mmol) of methoxypolyethylene glycol monoacrylate (Blemer AME-400, a compound of the aforementioned formula (VI) wherein m=9, manufactured by NOF Corporation), and following mixing to generate a homogeneous solution, 0.03 g (0.2 mmol) of di-n-butylamine was added, and the resulting mixture was heated to 80° C. to initiate the copolymerization reaction. Following reaction for 35 hours from the point of copolymerization initiation, the copolymerization reaction was halted by cooling the polymerization reaction system to 0° C. The AME-400 polymerization conversion ratio was 60%. The polymerization solution was then purified by passage through a column to remove the metal complex and any unreacted monomers, and the volatile fraction was then removed under reduced pressure, yielding a multi-branched polymer compound with a poly-(styrene-b-AME-400) type structure in which the methoxypolyethylene glycol acted as a graft chain. The thus obtained multi-branched polymer compound was a single peak polymer with Mn=178,000.

(3) Synthesis of a B-A-C Type Multi-Branched Polymer Compound

To 47 g of toluene under an argon atmosphere were added 0.02 g (0.02 mmol) of chloropentamethylcyclopentadienyl-bis(triphenylphosphine)ruthenium, 17.8 g (0.1 mmol) of the poly-(styrene-b-AME-400) polymer obtained in (2) above, 3.7 g (18 mmol) of isobornyl acrylate, and 0.57 g (5 mmol) of n-octane, and following mixing to generate a homogeneous solution, 0.03 g (0.2 mmol) of di-n-butylamine was added, and the resulting mixture was heated to 80° C. under constant stirring to initiate the copolymerization reaction. Following reaction for 20 hours from the point of reaction initiation, the copolymerization reaction was halted by cooling the polymerization reaction system to 0° C. The isobornyl acrylate conversion ratio was 30%. The polymerization solution was then purified by passage through a column to remove the metal complex and any unreacted monomers, and the volatile fraction was then removed under reduced pressure, yielding a multi-branched polymer compound with a poly-(styrene-b-AME-400-b-isobornyl acrylate) type structure in which the methoxypolyethylene glycol acted as a graft chain. The thus obtained multi-branched polymer compound was a single peak polymer with a ratio between the block chain A, and the combination of the block chain B and the block chain C of A/(B+C)=1.1/1 (degree of polymerization ratio), and Mn=189,000.

(4) Preparation, and evaluation of the properties of a solid polymer electrolyte film With the exception of using 0.08 g of LiClO$_4$, a uniform solid electrolyte film was prepared in the same manner as the example 1, and the ionic conductivity was measured. The measurement revealed an ionic conductivity at 23° C. of 2×10$^{-4}$ S/cm. Furthermore, inspection of the thus prepared film using a TEM revealed a similar network-type microphase separated structure to that of the solid polymer electrolyte obtained in the example 1.

EXAMPLE 5

Using the B-A-B type multi-branched polymer compound prepared in the example 1, LiClO$_4$ was added in a variety of different molar ratios, as shown in Table 1 (in the Li salt column), relative to each mol of ethylene oxide units, and solid polymer electrolytes were prepared in the same manner as the example 1. The conductivity (ionic conductivity) of each solid polymer electrolyte was then measured at a number of different temperatures, using the method described in the example 1. The results are shown in Table 1.

the reaction system. After allowing the copolymerization reaction to proceed for 2 hours, methanol was added to halt the reaction. When a small sample of the polymerization solution was removed from the reaction system and analyzed by gas chromatography it was evident that the polymerization had finished, and GPC analysis revealed that the product copolymer was a single peak polymer with Mn=130,000. The tetrahydrofuran was then removed from the reaction solution under reduced pressure, yielding a multi-branched polymer compound with a poly-(PME400-b-styrene-b-PME-400) type structure in which the methoxypolyethylene glycol acted as a graft chain. Although this multi-branched polymer compound has substantially the same composition and molecular weight as the multi-branched polymer compound produced in the example 1, because the styrene segment exhibits no pseudo cross-linking effect, the polymer compound was a viscous liquid at temperatures near room temperature, meaning film formation and ionic conductivity measurements were impossible.

COMPARATIVE EXAMPLE 2

Solid Polymer Electrolyte Comprising a B-a-B Type Multi-Branched polymer Compound in which the Block Chain A is Poly-Methoxypolyethylene Glycol Monomethacrylate, and the Block Chain B is Poly-Methyl Methacrylate To 32.69 g of toluene under an argon atmosphere were added 0.05 g (0.05 mmol) of dichlorotris(triphenylphosphine)ruthenium, 7.00 g (0.10 mmol) of P-PME1000 obtained in the example 2, 7.01 g (70 mmol) of methyl methacrylate (hereafter abbreviated as MMA), and 0.57 g (5.0 mmol) of n-octane, and following mixing to generate a homo-

TABLE 1

| Li salt | Conductivity (S/cm) | | | | | |
| --- | --- | --- | --- | --- | --- | --- |
| | 10° C. | 20° C. | 30° C. | 40° C. | 50° C. | 60° C. |
| 0.03 | 7.2E−05 | 2.0E−04 | 3.2E−04 | 4.4E−04 | 5.4E−04 | 7.0E−04 |
| 0.05 | 9.2E−05 | 3.0E−04 | 4.6E−04 | 5.6E−04 | 6.3E−04 | 8.5E−04 |
| 0.08 | 2.1E−05 | 6.0E−05 | 1.8E−04 | 3.0E−04 | 4.8E−04 | 5.5E−04 |

COMPARATIVE EXAMPLE 1

Solid Polymer Electrolyte Comprising a a-B-a Type Multi-Branched Polymer Compound in which the Block Chain A is Poly-Methoxypolyethylene Glycol Monomethacrylate and the Block Chain B is Polystyrene Under conditions including constant stirring under an argon atmosphere at a temperature of −78° C., 2.05 g (19.2 mmol) of styrene was added to 200 ml of a tetrahydrofuran solution containing 0.15 mmol of α-methylstyrene tetramer disodium, and the polymerization reaction was allowed to proceed for 1 hour. When a small sample of the polymerization solution was removed from the reaction system and analyzed by gas chromatography it was evident that the polymerization had finished, and GPC analysis revealed that the product polymer was a single peak polymer with Mn=13,000. Subsequently, the temperature of the reaction system was raised to −40° C., 0.31 mmol of diphenylethylene was added, and 18.10 g (36.5 mmol) of PME-400 was added dropwise to geneous solution, 0.03 g (0.2 mmol) of di-n-butylamine was added, and the resulting mixture was heated to 80° C. under constant stirring to initiate the polymerization reaction. Following reaction for 20 hours from the point of reaction initiation, the polymerization reaction was halted by cooling the polymerization reaction system to 0° C. The MMA polymerization ratio was 55%. The polymerization solution was then purified by passage through a column to remove the metal complex and any unreacted monomers, and the solvent was then removed under reduced pressure, yielding a multi-branched polymer compound with a poly-(MMA-b-PME-1000-b-MMA) type structure in which the methoxypolyethylene glycol acted as a graft chain. The thus obtained multi-branched polymer compound was a single peak polymer with a ratio between the block chain A and the block chain B of A/B=1/6 (degree of polymerization ratio), and Mn=107,000. Furthermore, the thus obtained multi-branched polymer compound was dissolved in acetone and used to generate a film, although inspection of the cross-section of this film under a transmission electron microscope revealed a uniform structure, with no evidence of a microphase separated structure.

Measurement of the ionic conductivity in the same manner as the example 1 revealed a result at 23° C. of $2\times10^{-6}$ S/cm.

INDUSTRIAL APPLICABILITY

A solid polymer electrolyte of the present invention, which exhibits a network-type microphase separated structure as a result of the positioning of segments such as styrene with no ionic conductivity adjacent to ion conductive segments such as polyethylene glycol mono(meth)acrylate, displays practical levels of thermal characteristics, physical characteristics, and ionic conductivity, meaning it has potential uses as the solid polymer electrolyte used in electrochemical elements such as lithium batteries, and because the solid polymer electrolyte of the present invention enables reductions in both the size and weight of such elements, it is expected to offer considerable industrial benefits.

The invention claimed is:

1. A solid polymer electrolyte comprising an electrolyte salt, and a copolymer in which
a block chain A containing a repeating unit represented by a formula (I) shown below:

(wherein, $R_1$ to $R_3$ each represent, independently, a hydrogen atom or a hydrocarbon group of C1 to C10, $R_1$ and $R_3$ may be bonded together to form a ring, $R_{4a}$ and $R_{4b}$ each represent, independently, a hydrogen atom or a methyl group, $R_5$ represents a hydrogen atom, a hydrocarbon group, an acyl group, or a silyl group, m represents an integer from 10 to 100, and individual $R_{4a}$ and $R_{4b}$ groups are either identical or different),
a block chain B containing a repeating unit represented by a formula (II) shown below:

(wherein, $R_6$ to $R_8$ each represent, independently, a hydrogen atom or a hydrocarbon group of C1 to C10, and $R_9$ represents an aryl group), and
a block chain C containing a repeating unit represented by a formula (III) shown below:

(wherein, $R_{10}$ to $R_{12}$ each represent, independently, a hydrogen atom or a hydrocarbon group of C1 to C10, and $R_{13}$ represents an aryl group or a heteroaryl group) are arranged in a sequence B, A, C,
wherein the copolymer exhibits a microphase separated structure.

2. A solid polymer electrolyte according to claim 1, wherein said block chains A to C form a copolymer with a B-A-C bonding sequence.

3. A solid polymer electrolyte according to claim 1, wherein a degree of polymerization of a repeating unit represented by said formula (I) is at least 10.

4. A solid polymer electrolyte according to claim 1, wherein a degree of polymerization of a repeating unit represented by said formula (II) is at least 5.

5. A solid polymer electrolyte according to claim 1, wherein a degree of polymerization of a repeating unit represented by said formula (III) is at least 5.

6. A solid polymer electrolyte according to claim 1, wherein said group $R_{13}$ in said formula (III) is an aryl group, and a degree of polymerization of a repeating unit represented by said formula (III) is at least 5.

7. A solid polymer electrolyte according to claim 1, wherein a molar ratio ((I)/((II)+(III))) between repeating units represented by said formula (I), and a combined total of repeating units represented by said formula (II) and repeating units represented by said formula (III) is within a range from 1/30 to 30/1.

8. A solid polymer electrolyte according to claim 1, wherein a number average molecular weight of said copolymer is within a range from 5,000 to 1,000,000.

9. A solid polymer electrolyte according to claim 1, wherein said electrolyte salt is one or more materials selected from the group consisting of alkali metal salts, quaternary ammonium salts, quaternary phosphonium salts, transition metal salts, and protonic acids.

10. A solid polymer electrolyte according to claim 1, wherein said electrolyte salt is a lithium salt.

11. A copolymer in which
a block chain A containing a repeating unit represented by a formula (I) shown below:

(wherein, $R_1$ to $R_3$ each represent, independently, a hydrogen atom or a hydrocarbon group of C1 to C10, $R_1$ and $R_3$ may be bonded together to form a ring, $R_{4a}$ and $R_{4b}$ each represent, independently, a hydrogen atom or a methyl group, $R_5$ represents a hydrogen atom, a hydrocarbon group, an acyl group, or a silyl group, m represents an integer from 10 to 100, and individual $R_{4a}$ and $R_{4b}$ groups are either identical or different), a block chain B containing a repeating unit represented by a formula (II) shown below:

(II)

(wherein, $R_6$ to $R_8$ each represent, independently, a hydrogen atom or a hydrocarbon group of C1 to C10, and $R_9$ represents an aryl group), and a block chain C containing a repeating unit represented by a formula (III) shown below:

(III)

(wherein, $R_{10}$ to $R_{12}$ each represent, independently, a hydrogen atom or a hydrocarbon group of C1 to C10, and $R_{13}$ represents an aryl group or a heteroaryl group) are arranged in a sequence B, A, C, wherein the copolymer exhibits a microphase separated structure.

12. A copolymer according to claim 11, wherein said block chains A to C are bonded together in a B-A-C sequence.

13. A copolymer according to claim 11, wherein a degree of polymerization of a repeating unit represented by said formula (I) is at least 10.

14. A copolymer according to claim 11, wherein a degree of polymerization of a repeating unit represented by said formula (II) is at least 5.

15. A copolymer according to claim 11, wherein a degree of polymerization of a repeating unit represented by said formula (III) is at least 5.

16. A copolymer according to claim 11, wherein said group $R_{13}$ in said formula (III) is an aryl group, and a degree of polymerization of a repeating unit represented by said formula (III) is at least 5.

17. A copolymer according to claim 11, wherein a molar ratio ((I)/((II)+(III))) between repeating units represented by said formula (I), and a combined total of repeating units represented by said formula (II) and repeating units represented by said formula (III) is within a range from 1/30 to 30/1.

18. A copolymer according to claim 11, wherein a number average molecular weight of said copolymer is within a range from 5,000 to 1,000,000.

19. A method of producing a copolymer according to Claim 11, which utilizes a living radical polymerization in which a transition metal complex is used as a catalyst, and an organohalogen compound comprising 1 or more halogen atoms is used as an initiator.

* * * * *

UNITED STATES PATENT AND TRADEMARK OFFICE
CERTIFICATE OF CORRECTION

PATENT NO. : 7,579,401 B2 Page 1 of 1
APPLICATION NO. : 10/523085
DATED : August 25, 2009
INVENTOR(S) : Muramoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 227 days.

Signed and Sealed this

Fourteenth Day of December, 2010

David J. Kappos
*Director of the United States Patent and Trademark Office*